(12) United States Patent
Konishi et al.

(10) Patent No.: US 7,440,300 B2
(45) Date of Patent: Oct. 21, 2008

(54) TRANSFORMERLESS POWER CONVERSION CIRCUIT FOR GRID-CONNECTED POWER GENERATION SYSTEMS

(75) Inventors: Yoshihiro Konishi, Hsinchu (TW);
Tain-Syh Luor, Hsinchu (TW);
Yung-Fu Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 180 days.

(21) Appl. No.: 11/319,653

(22) Filed: Dec. 29, 2005

(65) Prior Publication Data
US 2007/0047277 A1    Mar. 1, 2007

(30) Foreign Application Priority Data
Aug. 29, 2005    (TW) .............................. 94129415 A

(51) Int. Cl.
*H02M 7/5387*    (2007.01)
*G05F 1/24*    (2006.01)

(52) U.S. Cl. ...................... 363/132; 323/222; 323/266; 363/98

(58) Field of Classification Search ................. 363/131, 363/132, 136, 137, 95, 98, 89, 90, 37, 65, 363/67, 68, 71; 323/259, 260, 261, 262, 323/903, 222, 225, 232, 266
See application file for complete search history.

(56) References Cited

U.S. PATENT DOCUMENTS

| | | | | |
|---|---|---|---|---|
| 5,592,371 | A | * | 1/1997 | Rajashekara et al. .......... 363/98 |
| 5,654,591 | A | * | 8/1997 | Mabboux et al. .............. 307/66 |
| 6,281,595 | B1 | * | 8/2001 | Sinha et al. ............... 290/40 A |
| 6,933,626 | B2 | * | 8/2005 | Oughton, Jr. .................. 307/64 |
| 6,961,250 | B2 | * | 11/2005 | Lin et al. ........................ 363/16 |
| 7,276,886 | B2 | * | 10/2007 | Kinder et al. ............... 323/267 |
| 7,333,349 | B2 | * | 2/2008 | Chang et al. ................... 363/17 |
| 2004/0165408 | A1 | * | 8/2004 | West et al. ................... 363/131 |

\* cited by examiner

*Primary Examiner*—Jeffrey L. Sterrett
*Assistant Examiner*—Harry Behm
(74) *Attorney, Agent, or Firm*—Birch, Stewart, Kolasch & Birch, LLP

(57) ABSTRACT

A transformerless power conversion circuit is interconnected with an electric grid and converts an input DC power provided by a power generator into an AC power and feeding the AC power into the grid. The power conversion circuit includes a buck-boost converter converting the input DC power into two sets of DC power levels; and at least one half-bridge inverter converting the two sets of DC power levels into the AC power for feeding into the grid. The isolating transformer can be eliminated and the common ground problem for DC side and AC side is also solved. The power conversion circuit has significant improvement for device size, manufacture cost and conversion efficiency.

3 Claims, 10 Drawing Sheets

TRANSFORMERLESS POWER CONVERSION CIRCUIT FOR GRID-CONNECTED POWER GENERATION SYSTEMS

BACKGROUND OF THE INVENTION

1. Field of the Invention

The present invention relates to a power converter circuit of DC to AC conversion, especially to a conversion circuit, which does not use transformer and transfer the electrical power of distributed energy to electric utility.

2. Description of Prior Art

The request for electrical power is increased as the industry keeps developing. However, the shortage of natural resource and environmental concern for new power plant will make the electrical power more insufficient. Therefore, the renewable energy generation becomes important issue in industrialized or advanced country.

FIG. 1 shows a prior art single-stage three-phase three-wire power conversion circuit. As shown in this figure, capacitors $C_1$ is parallel to DC power source for filtering noise and stabilizing voltage. In this conversion circuit, if the DC power source has common ground with the ground of public network. When the switch $Q_3$ is turned on and the switch $Q_4$ is turned off, the current flows along the path indicated by phantom line. The DC current will flow into the grid, this phenomenon is prohibited in many interconnection rules. Therefore, an output transformer is connected between the power conversion circuit and grid for isolation. FIG. 2 shows power conversion circuit with a transformer arranged on the output side of the power converter therefor providing isolation to AC ground. However, the transformer will increase the size, the cost of the power conversion circuit and reduce conversion efficiency.

FIG. 3 shows a prior art two stage three phase three wire power conversion circuit. In this circuit, both DC side and AC side are grounded, the DC current might flow into the grid through the common grounded points. This phenomenon is prohibited in many interconnection rules. Therefore, an transformer is connected between the power conversion circuit and the grid, as shown in FIG. 4.

FIG. 5 and FIG. 7 which are single stage and two stage power conversion circuits for single phase system, have both-side grounded with potential DC current flowing problem as mentioned above for FIG. 1 and FIG. 3. Therefore, an transformer is connected between the power conversion circuit and the grid, as shown in FIG. 6 and FIG. 8. However, the transformer will increase the size, weight, cost of the conversion circuit and reduce the conversion efficiency.

SUMMARY OF THE INVENTION

The present invention is intended to provide a transformerless power conversion circuit, wherein transformer is not needed and the DC current problem can be solved. Therefore, the power conversion circuit has significant improvement for device size, manufacture cost and conversion efficiency.

Accordingly, the present invention provides a transformerless power conversion circuit interconnection with the grid and converting an input DC power provided by a distributed generator into an AC power and feeding the AC power into the grid. The power conversion circuit includes a buck-boost converter converting the input DC power into two sets of DC power levels; and at least one half-bridge inverter converting the two sets of DC power levels into the AC power for feeding into the grid.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The present invention is intended to provide a transformerless conversion circuit, which feeds the electrical power of distributed power generator to the interconnected grid.

Figure 1:
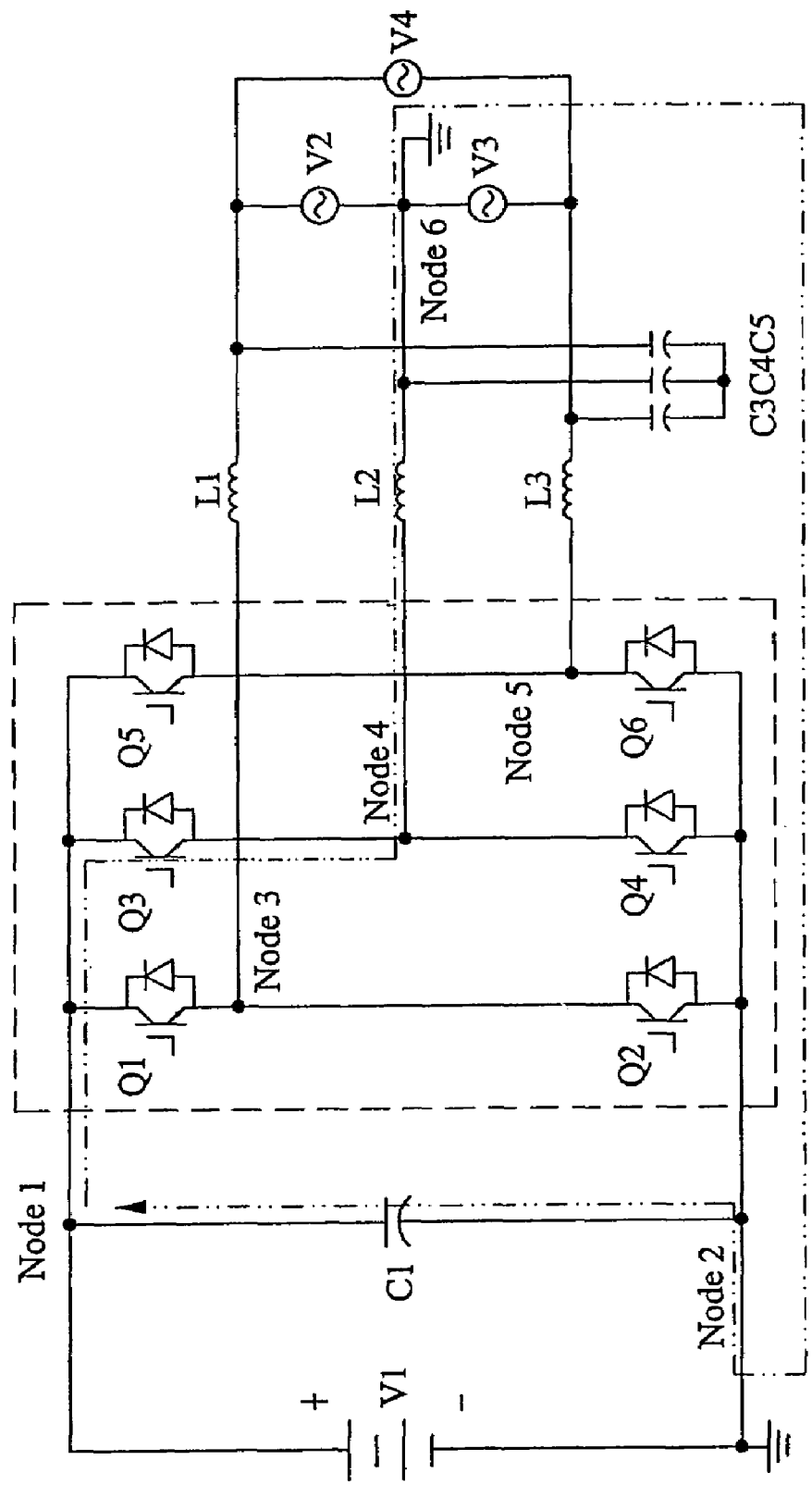
FIG. 1 shows a prior art single-stage three-phase three-wire power conversion circuit.
Figure 2:
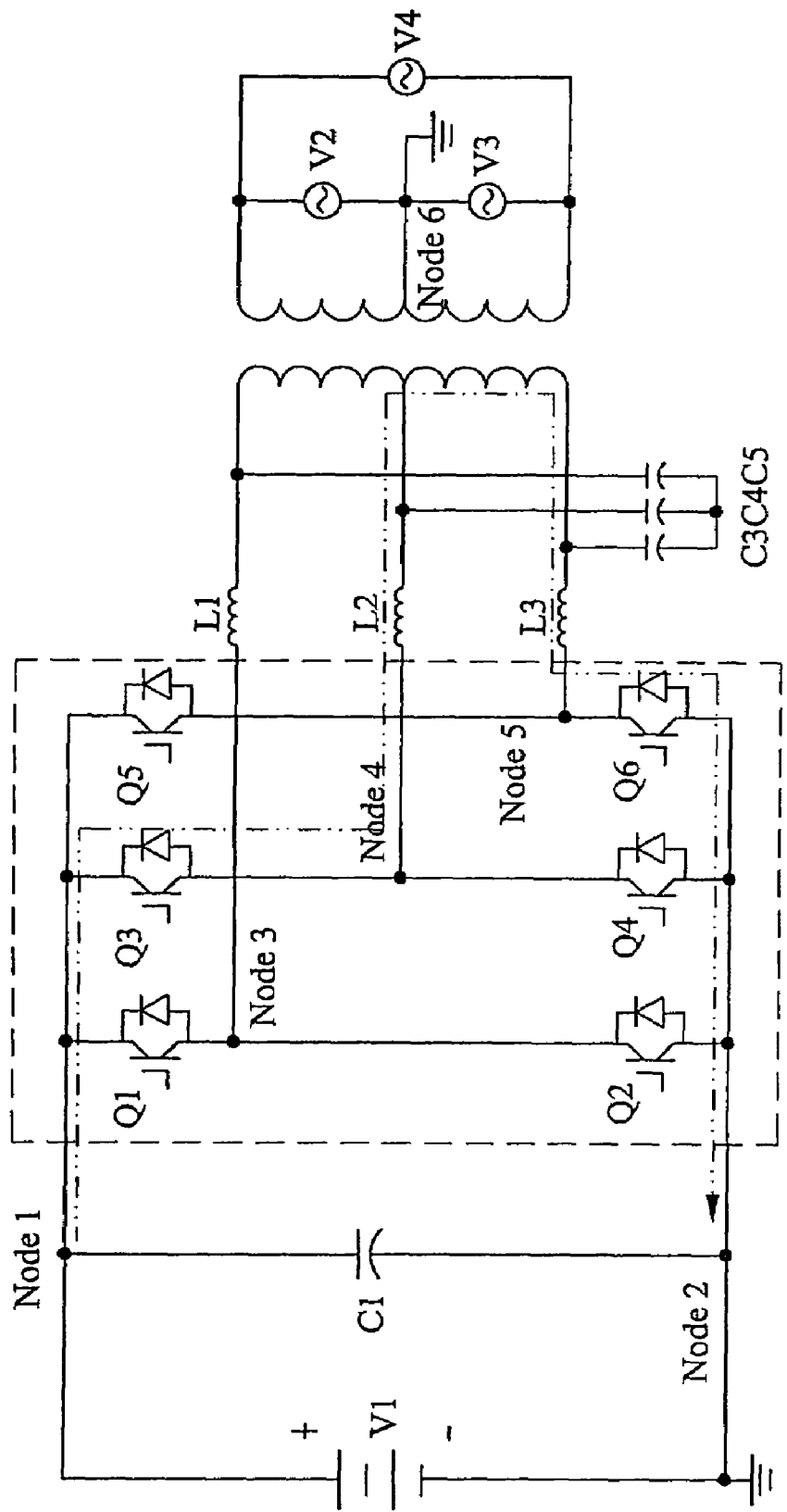
FIG. 2 shows prior art single-stage three-phase three-wire power conversion circuit with a transformer arranged on the output side thereof.
Figure 3:
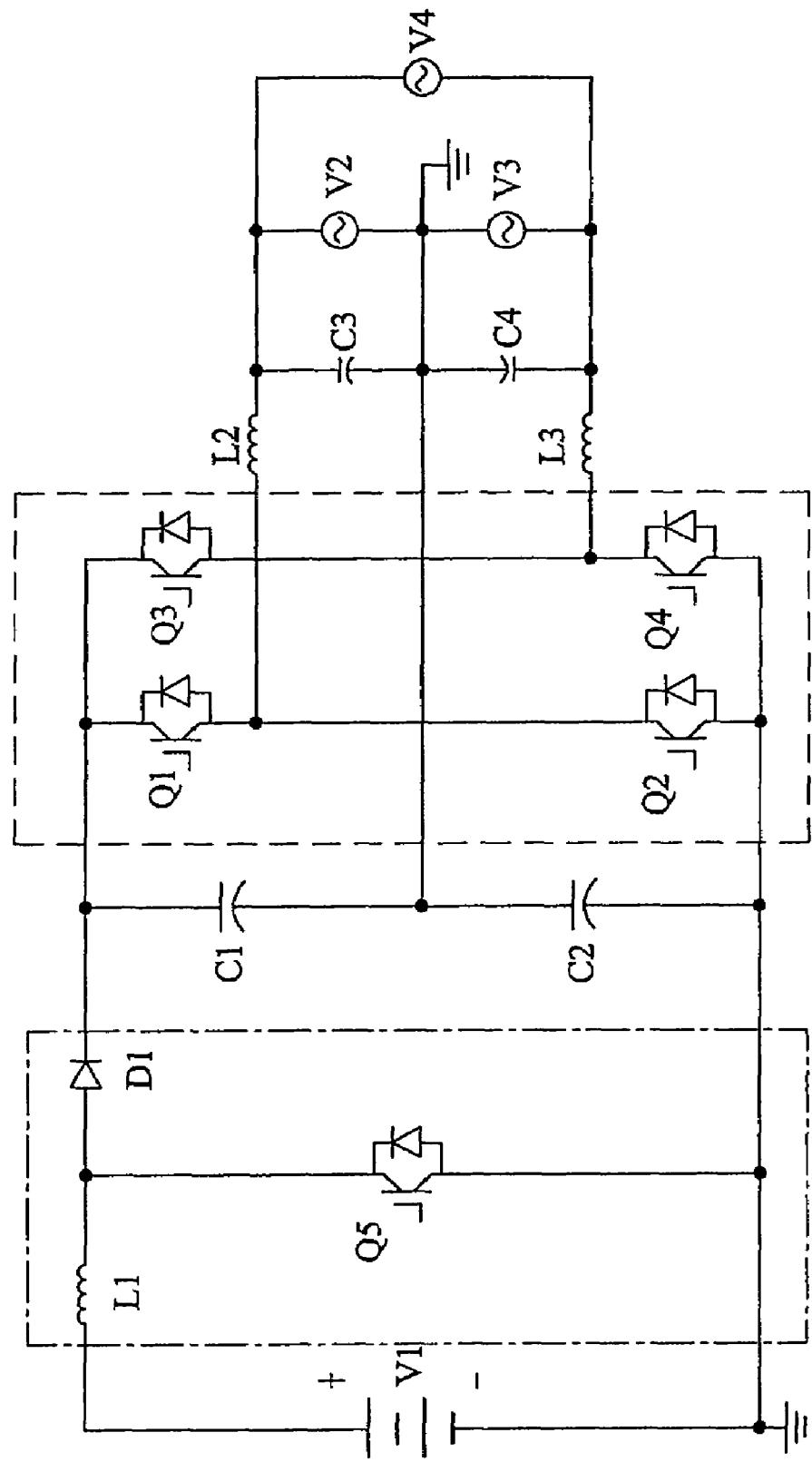
FIG. 3 shows a prior art two-stage three-phase three-wire power conversion circuit.
Figure 4:
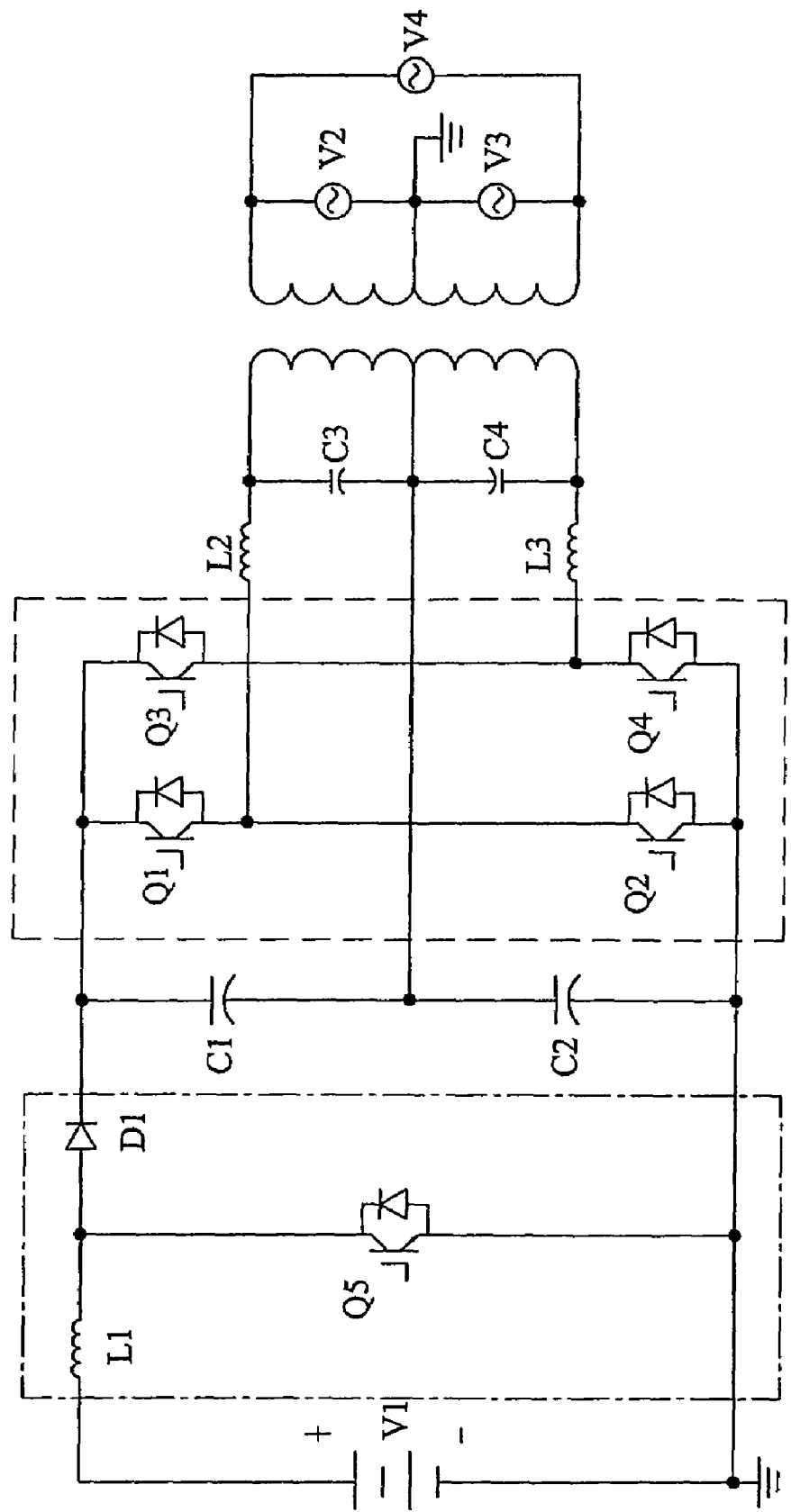
FIG. 4 shows prior art two-stage three-phase three-wire power conversion circuit with a transformer arranged on the output side thereof.
Figure 5:
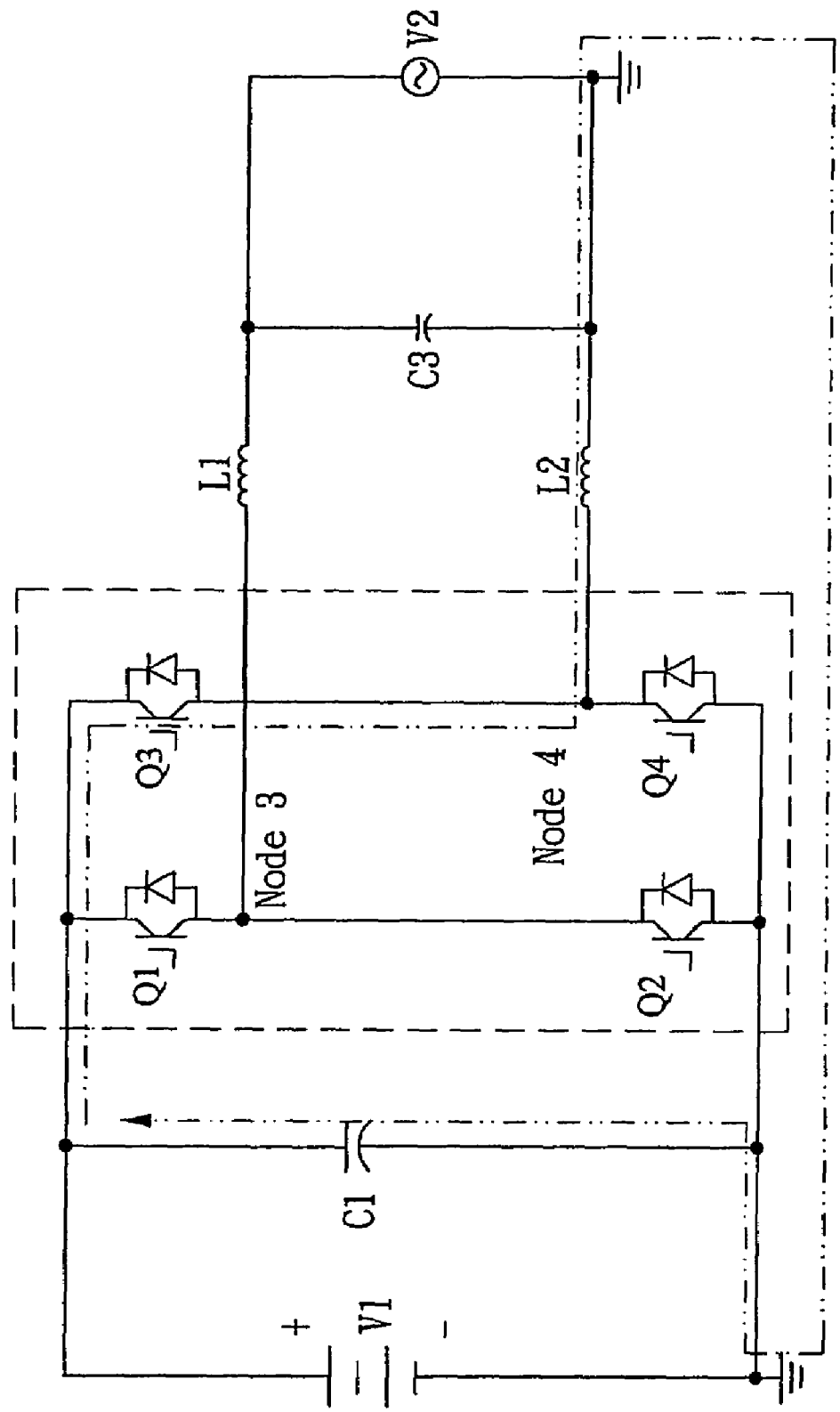
FIG. 5 shows a prior art single-stage two-phase two-wire power conversion circuit.
Figure 6:
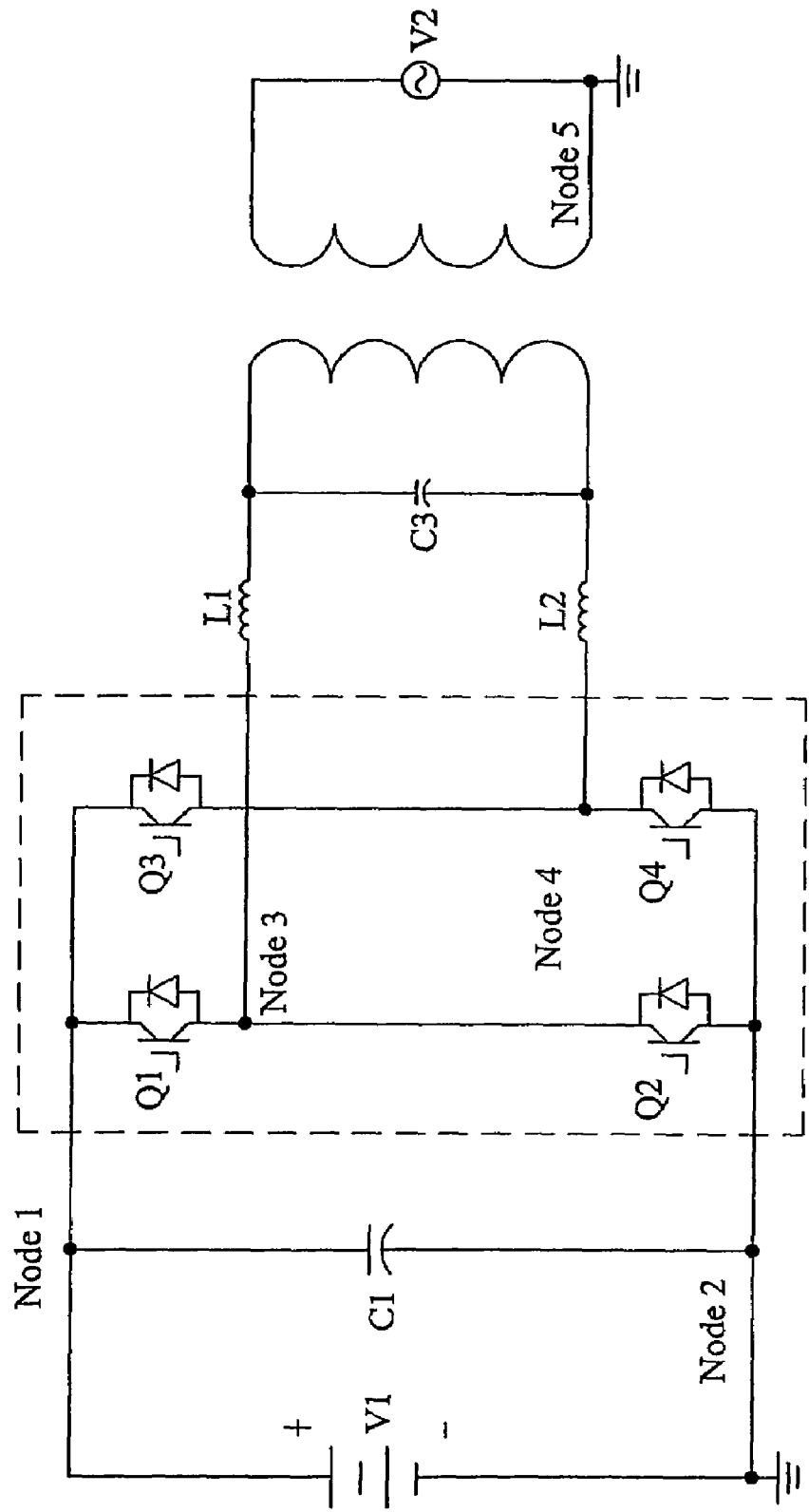
FIG. 6 shows prior art single-stage two-phase two-wire power conversion circuit with a transformer arranged on the output side thereof.
Figure 7:
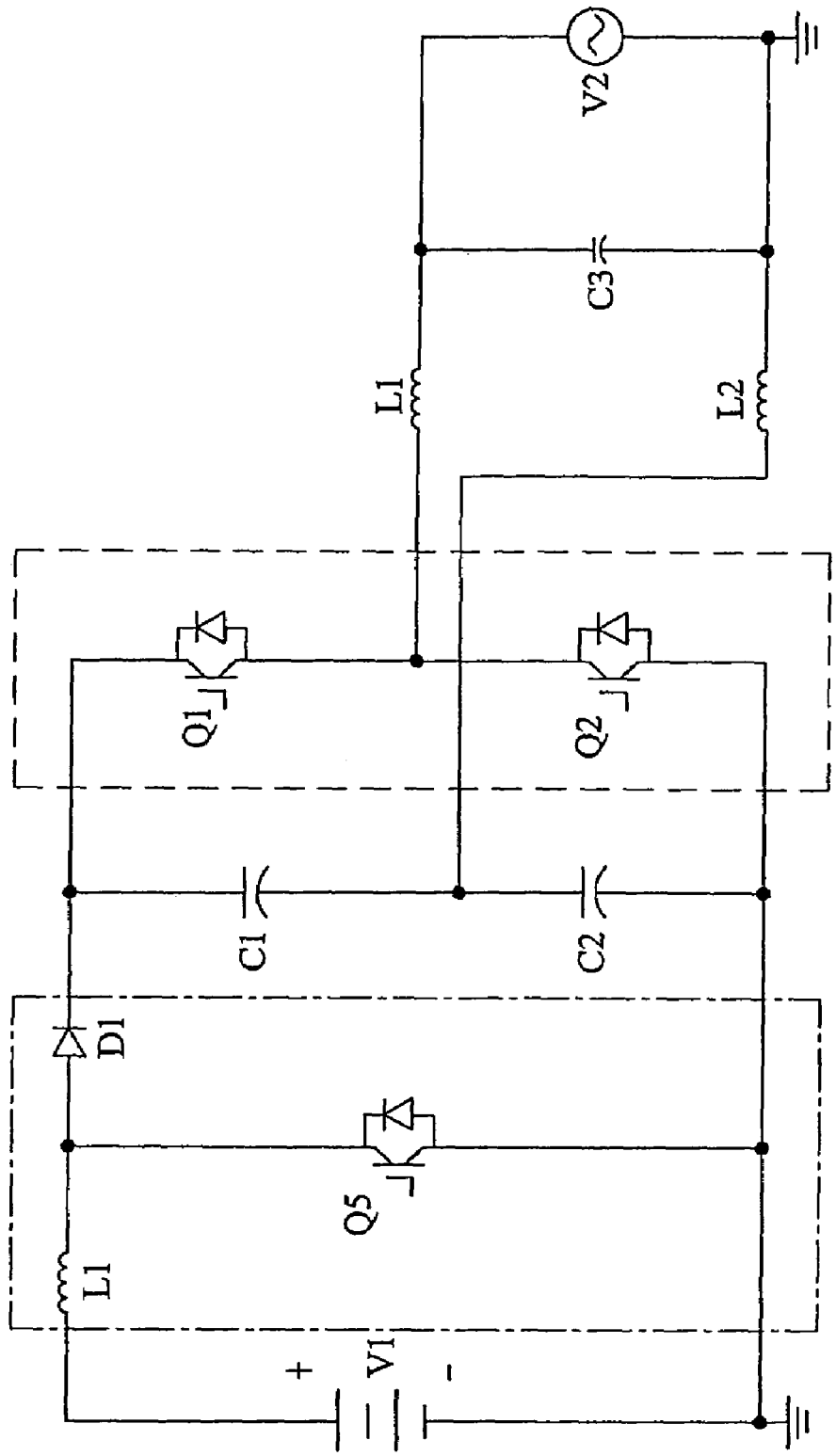
FIG. 7 shows a prior art two-stage single-phase two-wire power conversion circuit.
Figure 8:
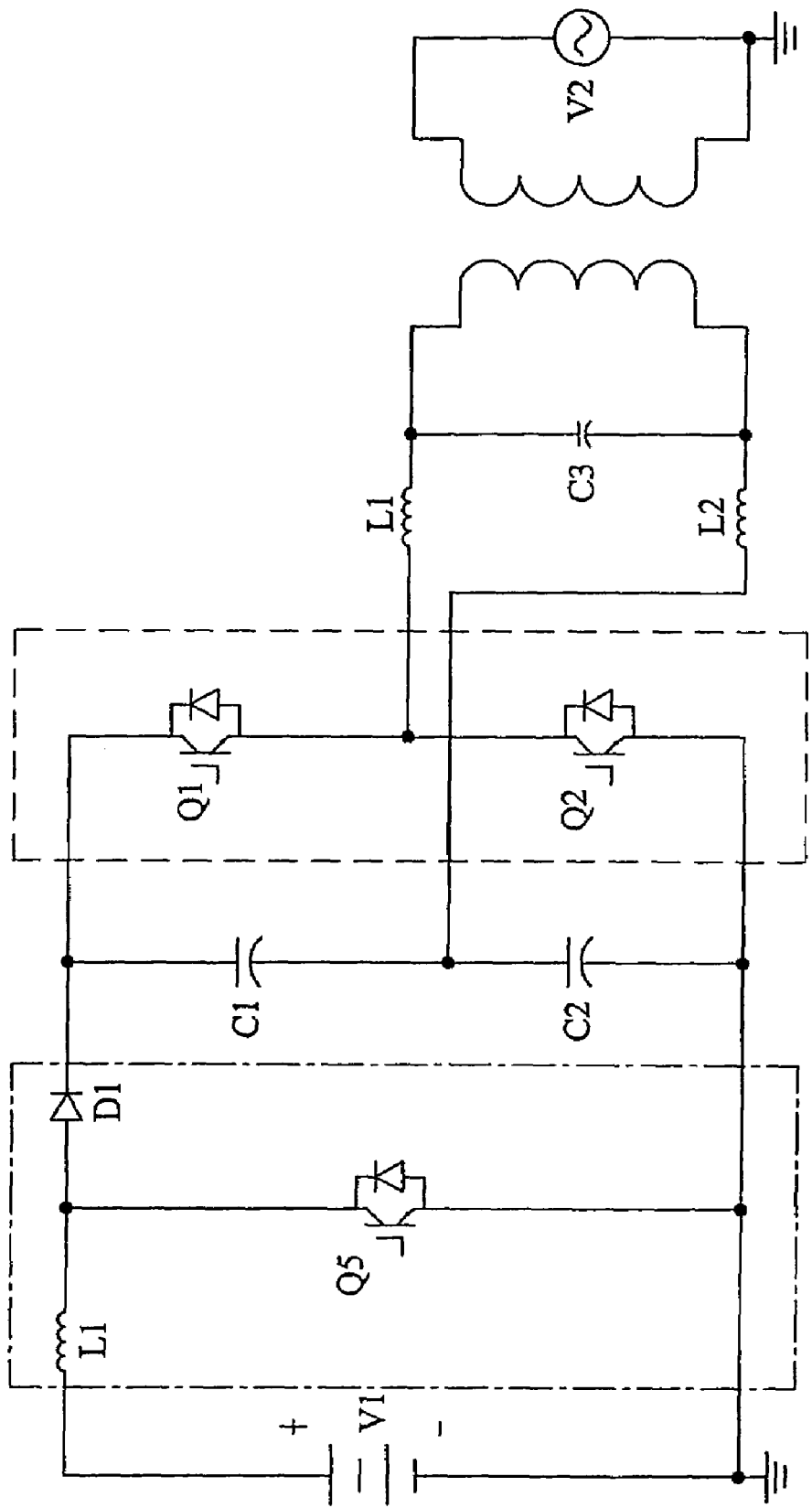
FIG. 8 shows prior art two-stage single-phase two-wire power conversion circuit with a transformer arranged on the output side thereof.
Figure 9:
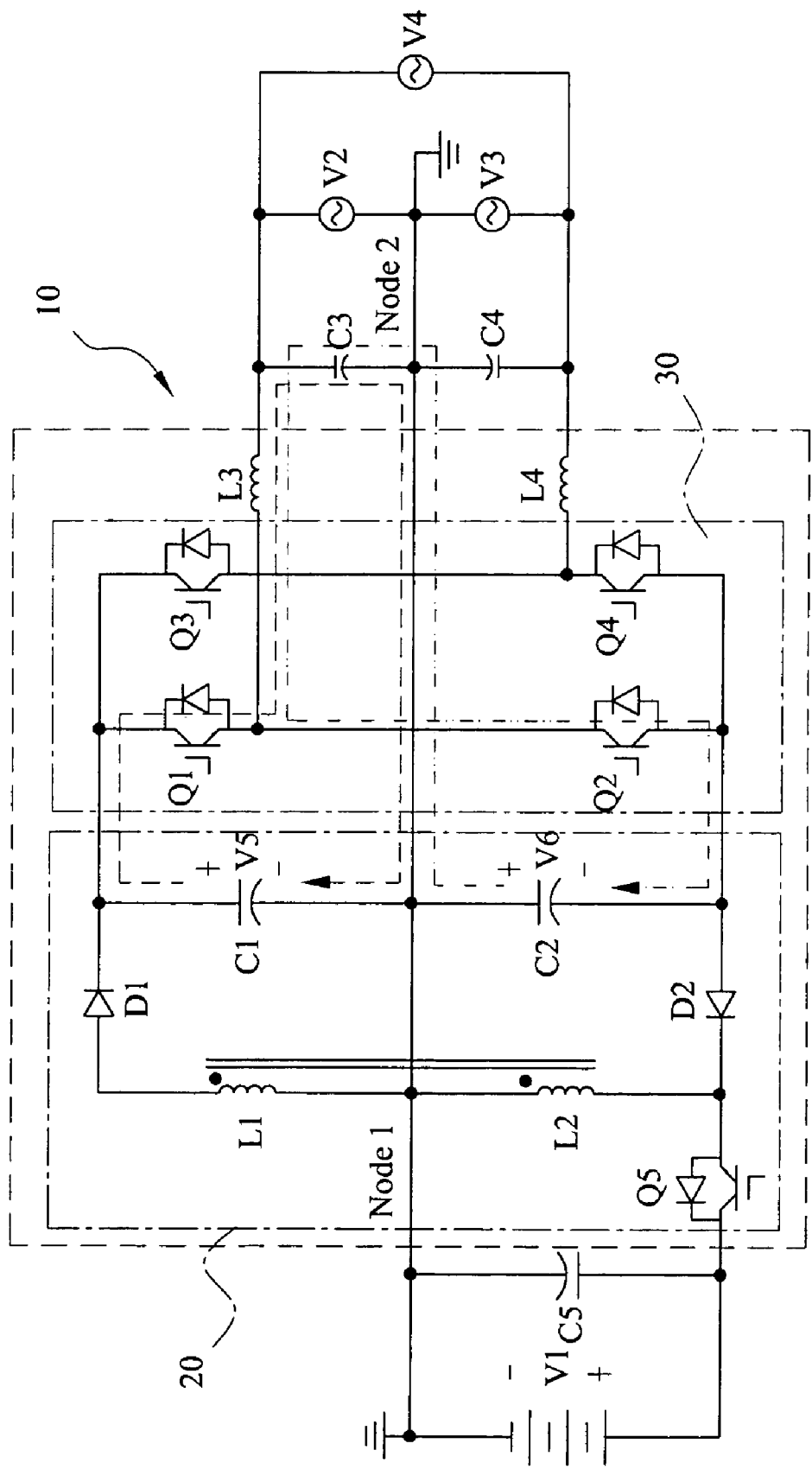
FIG. 9 shows the two-stage three-phase type power conversion circuit according to a preferred embodiment of the present invention.

FIG. 9 shows the two-stage three-phase power conversion circuit according to a preferred embodiment of the present invention. The two-stage three-phase power conversion circuit 10 comprises a buck-boost converter 20 and two half-bridge inverters 30. The buck-boost converter 20 converts a DC voltage source to two DC levels and comprises a first active switch $Q_5$, a coupled inductor (first inductor $L_1$ and second inductor $L_2$) sharing the same core, two passive switches (first passive switch $D_1$ and second passive switch $D_2$), and two capacitors (first capacitor $C_1$ and second capacitor $C_2$). The half-bridge inverter 30 converts the two DC levels into alternative voltage for feeding power to grid and comprises four active switches $Q_1$-$Q_4$.

The active switch $Q_5$ is electrically connected between the positive end of DC voltage source $V_1$ and the second inductor $L_2$. Another end of the second inductor $L_2$ is electrically connected to the negative end of the voltage source $V_1$ and also electrically connected to the first ground Node 1. One end of the first inductor $L_1$ is electrically connected to the first ground Node 1 and another end of the first inductor $L_1$ is electrically connected to the positive end of the first passive switch $D_1$.

The positive end of the second passive switch $D_2$ is electrically connected to the negative end of the second capacitor $C_2$. The positive end of the passive switch $D_1$ is electrically connected to another end of the first inductor $L_1$, while the negative end of the passive switch $D_1$ is electrically connected to the positive end of the first capacitor $C_1$.

The positive end of the second capacitor $C_2$ is electrically connected to the ground Node 1, the negative end of the second capacitor $C_2$ is electrically connected to the positive end of the second passive switch $D_2$. The positive end of the first capacitor $C_1$ is electrically connected to the negative end of the passive switch $D_1$. The negative end of the first capacitor $C_1$ is electrically connected to the ground Node 1.

When the current of the DC voltage source $V_1$ flows through the first active switch $Q_5$, energy is stored in the second inductor $L_2$. The energy is coupled from iron core to the first inductor $L_1$ because the first inductor $L_1$ and the second inductor $L_2$ share the same iron core. The buck-boost converter 20 will produce two DC voltage levels $V_5$, $V_6$ on the capacitors $C_1$ and $C_2$. The two DC voltage levels $V_5$, $V_6$ are converted into alternative voltage by the two half-bridge inverters 30.

The Node 1 is grounded for DC side and the Node 2 is grounded for AC side. The switch control circuit of the half-bridge inverters 30 is shown by phantom line. When the switch $Q_1$ is turned on, the current of the switch control circuit flows from the positive end of the capacitor $C_1$, and through the switch $Q_1$ and the capacitor $C_3$, and then flows back to the negative end of the capacitor $C_1$. When the switch $Q_2$ is turned on, the current of the switch control circuit flows from the negative end of the capacitor $C_2$, and through the switch $Q_2$ and the capacitor $C_3$, and then flows back to the positive end of the capacitor $C_2$.

Through the inductor couple circuit $L_1$ and $L_2$, the single DC input $V_1$ is converted to two DC voltages $V_5$ and $V_6$. When both the DC side and the AC side have grounded system, a common ground point Node 1 can be provided and the two DC inputs $V_5$ and $V_6$ can transmit energy to alternative source side by suitable circuit path.

Figure 10:
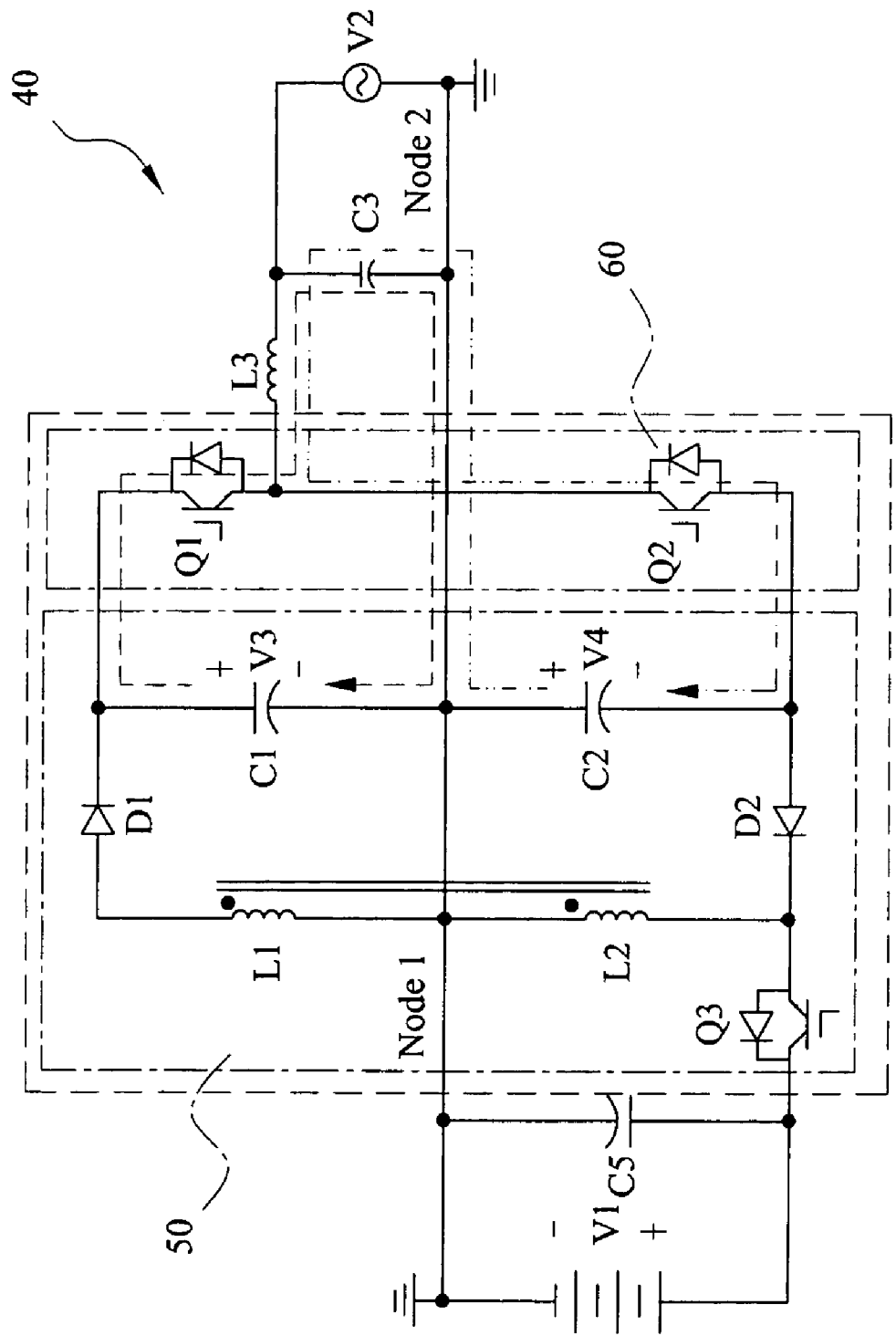
FIG. 10 shows the two-stage single-phase power conversion circuit according to another preferred embodiment of the present invention.

FIG. 10 shows the two-stage single-phase type power conversion circuit according to another preferred embodiment of the present invention. The two-stage single-phase type power conversion circuit 40 comprises a buck-boost converter 50 and a half-bridge inverter 60. In other word, one half-bridge inverter is removed in comparison with preferred embodiment of FIG. 9. The buck-boost converter 50 comprises a first active switch Q3, a set of inductors (first inductor $L_1$ and second inductor $L_2$) sharing the same core, two passive switches (first passive switch $D_1$ and second passive switch $D_2$), and two capacitors (first capacitor $C_1$ and second capacitor $C_2$). The half-bridge inverter 60 comprises two active switches $Q_1$-$Q_2$.

When the current of the DC voltage source $V_1$ flows through the first active switch $Q_3$, energy is stored in the second inductor $L_2$. The energy is coupled from iron core to the first inductor $L_1$ because the first inductor $L_1$ and the second inductor $L_2$ share the same iron core. The buck-boost converter 50 will produce two DC voltage levels $V_3$, $V_4$ on the capacitors $C_1$ and $C_2$. The two DC voltage levels $V_3$, $V_4$ are converted into alternative voltage by the two half-bridge inverters 60.

The Node 1 is grounded for DC side and the Node 2 is grounded for AC side. The switch control circuit of the half-bridge inverters 60 is shown by phantom line. When the switch $Q_1$ is turned on, the current of the switch control circuit flows from the positive end of the capacitor $C_1$, and through the switch $Q_1$ and the capacitor $C_3$, and then flows back to the negative end of the capacitor $C_1$. When the switch $Q_2$ is turned on, the current of the switch control circuit flows from the negative end of the capacitor $C_2$, and through the switch $Q_2$ and the capacitor $C_3$, and then flows back to the positive end of the capacitor $C_2$.

Through the inductor couple circuit $L_1$ and $L_2$, the single DC input $V_1$ is converted to two DC inputs $V_3$ and $V_4$. When both the DC side and the AC side have grounded system, a common ground point Node 1 can be provided and the two DC inputs $V_3$ and $V_4$ can transmit energy to alternative source side by suitable circuit path.

To sum up, the power conversion circuit according to the present invention can solve the problem of common ground and has significant improvement for device size, manufacture cost and conversion efficiency. Moreover, the manufacture cost and power loss can be further reduced by using less active switch.

TABLE

Comparison between the conventional power conversion circuit and the power conversion circuit according to the present invention

| Cases | Isolating transformer | Applicable DC/AC grounded system | Active switch number Single phase | Active switch number Three phase |
|---|---|---|---|---|
| Conventional single stage converter | None | One side grounded | 4 | 6 |
| | Output transformer | One side/two sides grounded | 4 | 6 |
| Conventional two stage converter | None | One side grounded | 3 | 5 |
| | Output transformer | One side/two sides grounded | 3 | 5 |
| | High frequency transformer | One side/two sides grounded | 8 | 10 |
| Present invention | None | One side/two sides grounded | 3 | 5 |

As can be seen from above table, the present invention solves the one side or two sides grounded problem for conventional power conversion circuit. The isolating transformer is removed to reduce size and weight of the power conversion circuit. The power conversion circuit according to the present invention has significant improvement for device size, manufacture cost and conversion efficiency. Moreover, the manufacture cost and power loss can be further reduced by using less active switches.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A transformerless power conversion circuit for distributed generation system interconnected with an electric grid, the power conversion circuit converting an input DC power provided by a power generator into an AC power and feeding the AC power into the grid, the power conversion circuit comprising:
   a buck-boost converter converting the input DC power into two sets of DC power levels, wherein the buck-boost converter comprising:
   a first active switch having an input end connected to a positive end of the input DC power;
   a first inductor and a second inductor sharing a same iron core; wherein one end of the first inductor is electrically connected to a grounded end, one end of the second inductor is electrically connected to an output end of the first active switch, another end of the second inductor is electrically connected to a negative end of the input DC power and the ground;

a first passive switch with a positive end connected to another end of the first inductor;

a second passive switch with a negative end connected to the output end of the first active switch;

a first capacitor with a positive end connected to a negative end of the first passive switch and a negative end connected to the ground;

a second capacitor with a positive end connected to the ground and a negative end connected to a positive end of the second passive switch; and at least one half-bridge inverter converting the two sets of DC power levels into the AC power for feeding into the grid.

2. The transformerless power conversion circuit as in claim 1, wherein the at least one half-bridge inverter generates three-phase electrical power and comprises four active switches.

3. The transformerless power conversion circuit as in claim 1, wherein the at least one half-bridge inverter generates single-phase electrical power and comprises two active switches.

* * * * *